US009374755B2

(12) United States Patent
Yang et al.

(10) Patent No.: US 9,374,755 B2
(45) Date of Patent: Jun. 21, 2016

(54) METHOD AND APPARATUS FOR HANDOVER IN WIRELESS COMMUNICATION NETWORK WITH CARRIER AGGREGATION

(75) Inventors: Tao Yang, Shanghai (CN); Seau Sian Lim, Wiltshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 279 days.

(21) Appl. No.: 13/643,731

(22) PCT Filed: May 3, 2010

(86) PCT No.: PCT/CN2010/072404
§ 371 (c)(1),
(2), (4) Date: Jan. 14, 2013

(87) PCT Pub. No.: WO2011/137579
PCT Pub. Date: Nov. 10, 2011

(65) Prior Publication Data
US 2013/0107862 A1 May 2, 2013

(51) Int. Cl.
H04W 36/24 (2009.01)
H04L 5/00 (2006.01)
(Continued)

(52) U.S. Cl.
CPC .............. *H04W 36/24* (2013.01); *H04L 5/001* (2013.01); *H04W 36/08* (2013.01); *H04W 36/0005* (2013.01)

(58) Field of Classification Search
None
See application file for complete search history.

(56) References Cited

U.S. PATENT DOCUMENTS

2011/0261704 A1* 10/2011 Etemad .................... 370/252
2012/0002643 A1* 1/2012 Chung et al. ............ 370/331
2012/0294694 A1* 11/2012 Garot ....................... 411/427

FOREIGN PATENT DOCUMENTS

CN          101588629 A     9/2009
CN          101615984 A     12/2009
(Continued)

OTHER PUBLICATIONS
International Search Report for PCT/CN2010/072404 dated Feb. 17, 2011.

(Continued)

*Primary Examiner* — Jae Y Lee
*Assistant Examiner* — Alan Lindenbaum
(74) *Attorney, Agent, or Firm* — Fay Sharpe, LLP

(57) ABSTRACT

The invention proposes a method to support a handover of a service of a user equipment between a source eNB and a destination eNB in a wireless communication network with carrier aggregation, which includes the steps of: the destination eNB determining a primary component carrier jointly with the source eNB; transmitting a handover command to be transmitted to the user equipment to the source eNB, the handover command including indication information of the primary component carrier and dedicated preamble assignment information; the source eNB receiving the handover command to be transmitted to the user equipment from the destination eNB and forwarding the handover command to the user equipment; and then the user equipment accessing the destination eNB in response to the handover command. Also apparatuses performing the foregoing method in the source eNB, the destination eNB and the user equipment are proposed correspondingly. The technical solution of the invention improves the smoothness and efficiency of handing over a service of a user equipment between two eNBs in a carrier aggregation scenario and simplifies data transmission between the source eNB and the destination eNB in the handover procedure of the user equipment.

14 Claims, 6 Drawing Sheets

(51) Int. Cl.
*H04W 36/08* (2009.01)
*H04W 36/00* (2009.01)

(56) References Cited

FOREIGN PATENT DOCUMENTS

| | | |
|---|---|---|
| CN | 101674586 A | 3/2010 |
| EP | 1 871 130 A1 | 12/2007 |
| JP | 2010-28816 | 2/2010 |
| WO | 2009/120286 A1 | 10/2009 |
| WO | 2011/122045 A1 | 10/2011 |

OTHER PUBLICATIONS

Catt, "Handover for Carrier Aggregation," 3GPP TSG RAN WG2 Meeting #66bis, Los Angeles, USA, Jun. 29-Jul. 3, 2009, Agenda Item: 7.3, Document for: Discussion and Decision, R2-093722, 3 pages.

NEC, "Mobility and Carrier Aggregation Signaling," 3GPP TSG-RAN WG2 #69, R2-101561, San Francisco, US, Feb. 22-26, 2010, Agenda Item: 71.10, Document for: Discussion and Decision, 2 pages.

Nokia Corporation, Nokia Siemens Networks, "Measurement Events in Carrier Aggregation," 3GPP TSG-RAN WG2 Meeting #69bis, Beijing, China, Apr. 12-16, 2010, R2-102098, Agenda item: 7.1.1.5, Document for: Discussion and Decision, 6 pages.

Huawei, "Intra LTE-A UE Handover Procedure inter-eNB for CA," 3GPP TSG RAN WG2 Meeting #67bis, R2-095814, Miyazaki, Japan, Oct. 12-Oct. 16, 2009, Agenda Item: 7.3, Document for: Discussion and Approval, 4 pages.

Potevio, "Inter-eNB handover for Carrier Aggregation," 3GPP TSG RAN WG2 #70, R2-102769, May 10-14, 2010, Montreal, Canada, Agenda Item: 7.1.5, Document for: Discussion and Decision, 2 pages.

Catt, "Consideration on RACH in CA," 3GPP TSG RAN WG2 Meeting #69, San Francisco, USA, Feb. 22-26, 2010, R2-101058, Agenda Item: 7.1.9, Document for: Discussion and Decision, 4 pages.

Notice of Reason for Refusal for corresponding Japanese Application No. 2013-508347, dated Dec. 17, 2013, 5 pages.

Samsung, "Handover—stage 2 level Issues," 3GPP TSG-RAN2 #69 bis meeting, Beijing, P.R. China, Apr. 12-16, 2010, Agenda Item: 7.1.1.3, Document for: Discussion and decision, 7 pages.

* cited by examiner

METHOD AND APPARATUS FOR HANDOVER IN WIRELESS COMMUNICATION NETWORK WITH CARRIER AGGREGATION

FIELD OF THE INVENTION

The present disclosure relates to the field of communication in a wireless communication network and particularly to a method and apparatus for handing over a user equipment between two eNBs in a wireless communication network with carrier aggregation.

BACKGROUND OF THE INVENTION

At present a User Equipment (UE) is configured with only one carrier resource of no more than 20M in a Long Term Evolution (LTE) system, and since there is only one carrier in the system, a handover procedure is performed directly over the carrier when the user equipment in the system is handed over from an eNB originally serving the user equipment (i.e., a source eNB) to another eNB (i.e., a destination eNB).

Carrier aggregation supported in LTE-Advanced includes aggregation of consecutive carriers as well as in-band and inter-band aggregation of inconsecutive carriers and has a maximum bandwidth that can be aggregated of up to 100 MHz. Thus 1 to 5 component carriers can be supported in a macro cell, and each component carrier shall be able to be configured as a carrier backward compatible with LTE in order to make LTE-A compatible with LTE, so each component carrier has a bandwidth of no more than 20M. In the foregoing application scenario of carrier aggregation, a component carrier has to be selected in the handover procedure while the user equipment is being handed over from the source eNB to the destination eNB. Unfortunately a technical solution of supporting the handover of the user equipment from the source eNB to the destination eNB in the carrier aggregation scenario has been absent in the existing LTE-A system.

SUMMARY OF THE INVENTION

In view of the foregoing problem of lacking a technical solution to a handover of a service of a user equipment between two eNBs in a carrier aggregation scenario, the invention proposes a method and apparatus for handing over a user equipment from a source eNB to a destination eNB in a wireless communication network in an application scenario of carrier aggregation.

According to an embodiment of the invention, there is provided a method, in a source eNB in a wireless communication network with carrier aggregation, of handing over a service of a user equipment to a destination eNB. The method comprises the steps of: determining a primary component carrier jointly with the destination eNB; receiving a handover command transmitted from the destination eNB to the user equipment, the handover command including indication information of the primary component carrier; and forwarding the handover command to the user equipment.

According to another embodiment of the invention, there is provided a method, in a destination eNB in a wireless communication network with carrier aggregation, of handing over a service of a user equipment from a source eNB to the destination eNB. The method comprises the steps of: determining a primary component carrier jointly with the source eNB; and transmitting a handover command to be transmitted to the user equipment to the source eNB, the handover command including indication information of the primary component carrier.

According to a further embodiment of the invention, there is provided a method, in a user equipment in a wireless communication network with carrier aggregation, of handing over a service of the user equipment from a source eNB to a destination eNB. The method comprises the steps of: receiving a handover command from the source eNB, the handover command including indication information of a determined primary component carrier; and accessing the destination eNB.

According to a further embodiment of the invention, there is provided an apparatus, in a source eNB in a wireless communication network with carrier aggregation, for handing over a service of a user equipment to a destination eNB. The apparatus comprises: a first determining device configured to determine a primary component carrier jointly with the destination eNB; a first receiving device configured to receive a handover command transmitted from the destination eNB to the user equipment, the handover command including indication information of the primary component carrier; and a command forwarding device configured to forward the handover command to the user equipment.

According to a further embodiment of the invention, there is provided an apparatus, in a destination eNB in a wireless communication network with carrier aggregation, for handing over a service of a user equipment from a source eNB to the destination eNB. The apparatus comprises: a second determining device configured to determine a primary component carrier jointly with the source eNB; and a command transmitting device configured to transmit a handover command to be transmitted to the user equipment to the source eNB, the handover command including indication information of the primary component carrier.

According to a further embodiment of the invention, there is provided an apparatus, in a user equipment in a wireless communication network with carrier aggregation, for handing over a service of the user equipment from a source eNB to a destination eNB. The apparatus comprises: a second receiving device configured to receive a handover command, the handover command including indication information of a determined primary component carrier; and an accessing device configured to access the destination eNB according to dedicated preamble assignment information.

With the method and apparatus of the invention, a handover of a user equipment from a source eNB to a destination eNB in a carrier aggregation scenario can be supported.

In an embodiment of the invention, the destination eNB and the source eNB jointly determine a primary component carrier: it is not necessary for the source eNB to forward measurement information from the user equipment to the destination eNB when the source eNB determines the primary component carrier with the coordination of the destination eNB. It is not necessary for the destination eNB to notify the source eNB of a traffic load condition of the destination eNB when the destination eNB determines the primary component carrier with the coordination of the source eNB. A traffic load between the source eNB and the destination eNB is alleviated in both of the foregoing scenarios.

In another embodiment of the invention, measurement information of channel qualities from the user equipment and information of traffic loads is synthetically considered to thereby determine a primary component carrier; and according to dedicated preamble assignment information in a received handover command, while the user equipment accessing the destination eNB over a primary component carrier or a secondary component carrier corresponding to the information, a higher access/handover success ratio and a smoothed handover procedure of the user equipment and smoothed communication procedures of the user equipment before and after the handover can be achieved.

BRIEF DESCRIPTION OF DRAWINGS

Other features, objects and advantages of the invention will become more apparent by reading the following detailed description of non-restrictive embodiments taken with reference to the drawings in which.

Identical or like reference numerals denote identical or like step features or devices (modules) throughout the drawings.

DETAILED DESCRIPTION OF EMBODIMENTS

Non-restrictive embodiments of the invention will be described below in details with reference to the drawings.

Without loss of generality, all the following embodiments of the invention can be applicable to an LTE-A network in a carrier aggregation scenario, but those skilled in the art shall appreciate that the invention can also be applicable to other types of network.

Figure 1:
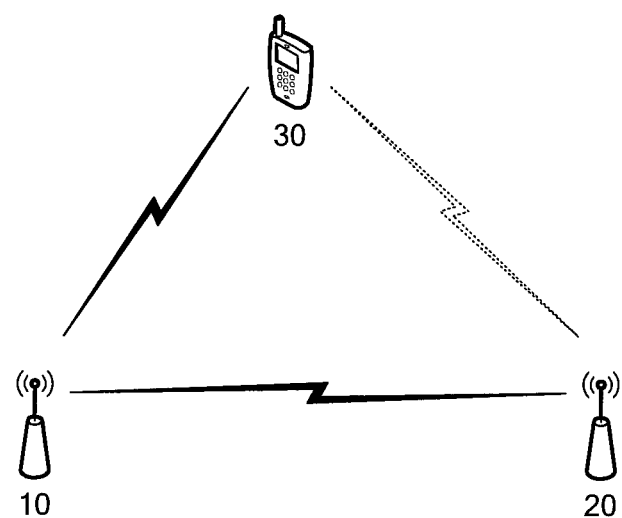
FIG. 1 is a topology diagram of a system of a wireless communication network including a source eNB, a destination eNB and a user equipment according to an embodiment of the invention.

FIG. 1 is a topology diagram of a system of a wireless communication network according to an embodiment of the invention. As illustrated, the system includes a source eNB 10, a destination eNB 20 and a user equipment 30, where a service of the user equipment 30 is handed over from the source eNB 10 to the destination eNB 20.

Figure 2:
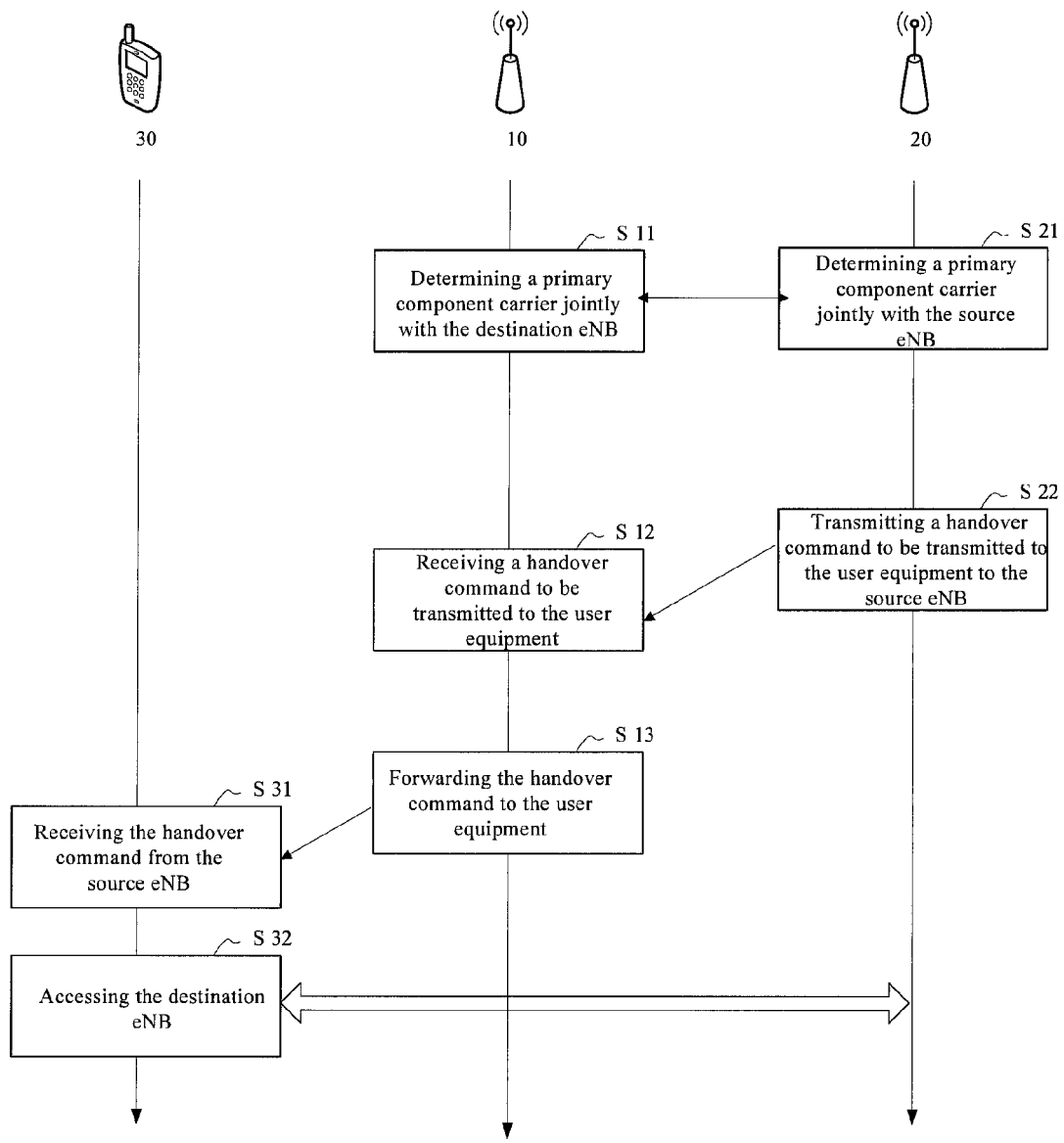
FIG. 2 is a flow chart of a method of handing over a service of a user equipment between a source eNB and a destination eNB in a wireless communication network according to an embodiment of the invention.

FIG. 2 is a flow chart of a method according to an embodiment of the invention, which is applied to a handover of a service of the user equipment 30 between the source eNB 10 and the destination eNB 20 in the wireless communication network. As illustrated, the method comprises three steps S11, S12 and S13 performed by the source eNB 10, two steps S21 and S22 performed by the destination eNB 20 and steps S31 and S32 performed by the user equipment 30.

In the step S11, the source eNB 10 determines a primary component carrier jointly with the destination eNB 20.

In the step S21, the destination eNB 20 determines a primary component carrier jointly with the source eNB 10.

With the foregoing steps S11 and S21, the source eNB 10 and the destination eNB 20 coordinate with each other to determine the primary component carrier. Next in the step S22, the destination eNB 20 transmits a handover command to be transmitted to the user equipment 30 to the source eNB 10, and the handover command includes indication information of the primary component carrier.

Next in the step S12, the source eNB 10 receives the handover command to be transmitted to the user equipment from the destination eNB, and the handover command includes the indication information of the primary component carrier. Then in the step S13, the source eNB 10 forwards the handover command to the user equipment 30.

Next in the step S31, the user equipment 30 receives the handover command from the source eNB 10, wherein the handover command includes the indication information of the determined primary component carrier. Next in the step S32, the user equipment 30 accesses the destination eNB 20.

Figure 3:
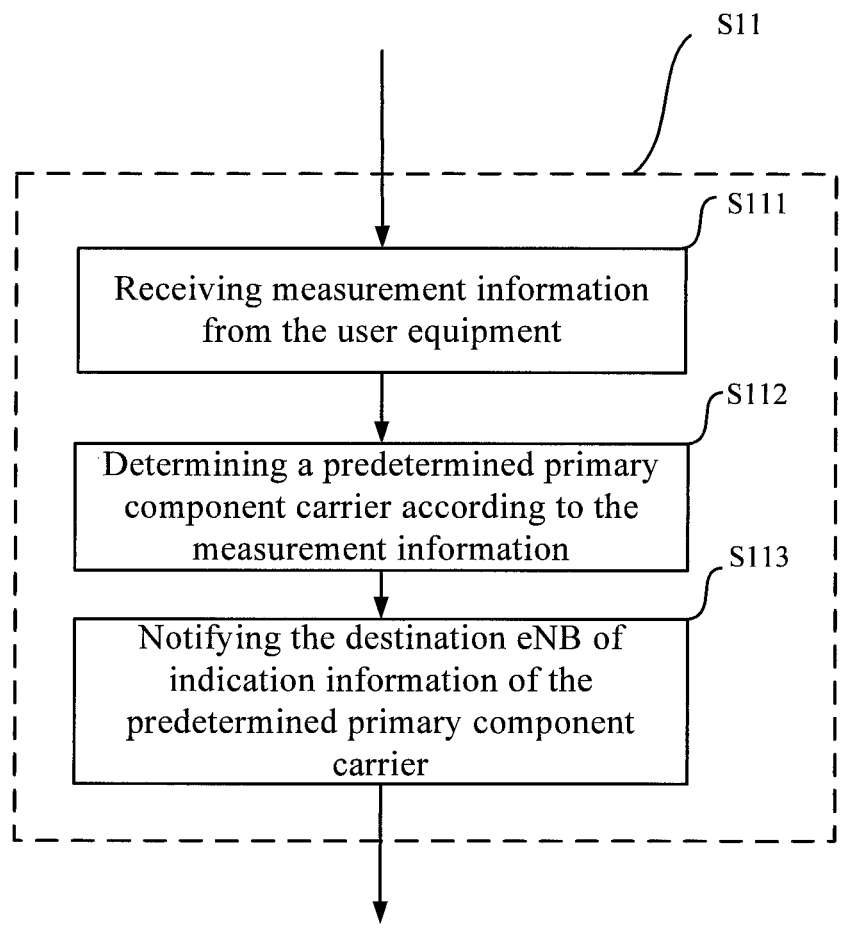
FIG. 3 is a flow chart of a method for a source eNB to determine a primary component carrier with the coordination of a destination eNB in a wireless communication network according to an embodiment of the invention.

FIG. 3 is a flow chart of the step S11 in which the source eNB 10 acts as a dominator device for determining the primary component carrier with the coordination of the destination eNB in the wireless communication network according to an embodiment of the invention. As illustrated, the step S11 comprises three sub-steps S111, S112 and S113 in this embodiment.

In the step S111, the source eNB 10 receives measurement information from the user equipment. Next in the step S112, the source eNB 10 determines a predetermined primary component carrier according to the measurement information. Then in the step S113, the source eNB 10 sequentially notifies the destination eNB of indication information of the predetermined primary component carrier.

Figure 4:
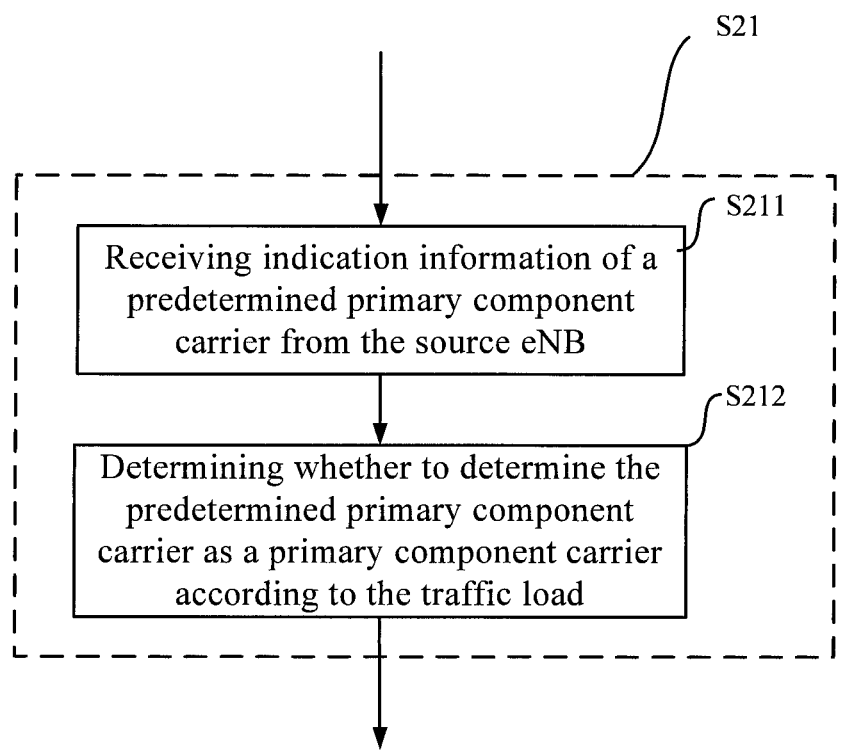
FIG. 4 is a flow chart of a method for a destination eNB to determine a primary component carrier with the coordination of a source eNB in a wireless communication network according to an embodiment of the invention.

FIG. 4 is a flow chart of a method for the source eNB 10 to act as a dominator device for determining the primary component carrier with the coordination of the source eNB in the wireless communication network according to an embodiment of the invention. As illustrated, the step S21 includes two sub-steps S211 and S212 in this embodiment.

In the step S211, the destination eNB 20 receives indication information of the predetermined primary component carrier from the source eNB 10. In the step S212, the destination eNB 20 determines whether to determine the predetermined primary component carrier as the primary component carrier according to the measurement information and the traffic load. Optionally the destination eNB 20 can further determine whether to determine the predetermined primary component carrier as the primary component carrier according to the measurement information and other information.

A method of handing over a service of the user equipment 30 from the source eNB 10 to the destination eNB 20 will be described in details below with reference to FIG. 1 to FIG. 4.

In an embodiment of the invention, the destination eNB 20 is configured with three component carriers CC1, CC2 and CC3 (not illustrated).

In an embodiment of the invention, the source eNB 10 is a dominator and the destination eNB 20 assists the source eNB 10 in determining a primary component carrier in a step of determining the primary component carrier in a handover procedure. Firstly in the step S11, the source eNB 10 determines a primary component carrier from the foregoing three component carriers jointly with the destination eNB 20.

In this embodiment, the step S11 includes three sub-steps S111, S112 and S113.

Firstly in the step S111, the source eNB 10 receives measurement information from the user equipment 30, and the measurement information identifies the channel quality, etc.

Secondly in the step S112, the source eNB 10 determines a predetermined primary component carrier according to the measurement information from the user equipment 30. For example, the measurement information indicates that CC1 is of better channel quality, then the source eNB 10 can determine the component carrier CC1 as the predetermined primary component carrier. Optionally in the step S112, the source eNB 10 can further determine two or more predetermined primary component carriers from the component carriers with better channel qualities for the destination eNB 20 to determine a primary component carrier in the step S212 eventually.

Thirdly in the step S113, the source eNB 10 notifies the destination eNB 20 of indication information of the predetermined primary component carrier, i.e., that the CC1 is determined as the predetermined primary component carrier. Optionally the source eNB 10 further notifies the destination eNB 20 of a security key related to the predetermined primary component carrier CC1; and if a secondary component carrier has been predetermined or determined, for example, as the CC3, then the source eNB 10 further notifies the destination eNB 20 of indication information of the secondary component carrier CC3, etc.

In correspondence to the step S11 performed by the source eNB 10, the destination eNB 20 determines a primary component carrier jointly with the source eNB 10 in the step S21 at the side of the destination eNB 20.

In this embodiment, the step S21 includes two sub-steps S211 and S212.

In the step S211, the destination eNB 20 receives indication information of the predetermined primary component carrier from the source eNB 10, that is, the component carrier CC1 being determined as the predetermined primary component carrier.

In the step S212, the destination eNB 20 determines whether to determine the predetermined primary component carrier CC1 as the primary component carrier according to the traffic load. Optionally the destination eNB 20 can further determine whether to determine the predetermined primary component carrier CC1 as the primary component carrier according to the measurement information and other information.

For example, if the traffic load over the component carrier CC1 is in a reasonable range enabling it to be used as a primary component carrier, then the destination eNB 20 confirms the predetermined primary component carrier CC1 as the primary component carrier.

Optionally the destination eNB 20 can further perform connection admission control over the predetermined primary component carrier notified by the source eNB 10 between the step S211 and the step S212.

In this embodiment, if the destination eNB 20 determines that the predetermined primary component carrier CC1 is not suitable to be the primary component carrier in the step S212, for example, in the case of the component carrier CC1 having a traffic load above those of the component carriers CC2 and CC3 and approximating a full load in this embodiment, then the destination eNB 20 notifies the source eNB 10 of indication information of a component carrier with a lower traffic load than the predetermined primary component carrier. That is, the component carrier CC2 with the lowest traffic load in the system is selected, and the source eNB 10 is notified of the component carrier CC2 with the lowest traffic load in the system and its traffic load related information, or the source eNB 10 is notified of both of the component carriers CC2 and CC3 and their traffic load related information, wherein both the component carriers CC2 and CC3 have traffic loads lower than that of the component carrier CC1 in this embodiment. Next after the source eNB 10 receives the information of the component carriers CC2 and CC3 with lower traffic loads from the destination eNB 20, the source eNB 10 then determines a primary component carrier synthetically considering the measurement information, from the user equipment 30, reflecting a channel quality, etc. For example, the CC2 with the lowest traffic load and a better channel quality is selected as the primary component carrier and the destination eNB 20 is notified of that the component carrier CC2 is determined the primary component carrier.

Those skilled in the art shall appreciate here that while the process of determining the primary component carrier is completed after only one interactive coordination between the source eNB 10 and the destination eNB 20 in the foregoing embodiments of the invention, when the destination eNB 20 is notified of the primary component carrier (e.g., the CC2) determined by the source eNB 10 after synthetically considering the measurement information of the component carriers from the user equipment and the traffic loads, the destination eNB 20 can further notify the source eNB 10 of indication information of a component carrier with a lower traffic load than the primary component carrier CC2 determined by the source eNB 10 (e.g., the CC3) for the source eNB 10 to re-determine the primary component carrier, if the destination eNB 20 finds out from a current traffic load condition of the component carrier that the current traffic load condition of the component carrier CC2 still does not satisfy the condition of being a primary component carrier. This process can be performed repeatedly until the primary component carrier re-determined by the source eNB 10 is confirmed by the destination eNB 20. The invention will not be limited to the above mentioned specific number of times of the interactions between the source eNB 10 and the destination eNB 20 to confirm the primary component carrier in the method according to this embodiment of the invention.

In another embodiment of the invention, the destination eNB 20 is a dominator and the source eNB 10 assists the destination eNB 20 in determining a primary component carrier in the step of determining the primary component carrier in a coordinated way in a handover procedure.

Firstly in the step S11, the source eNB 10 determines a primary component carrier from the foregoing three component carriers jointly with the destination eNB 20. In this embodiment, the step S11 comprises the following sub-steps: firstly the source eNB 10 receives measurement information about the component carriers CC1, CC2 and CC3 of the destination eNB 20 from the user equipment 30, and the information can reflect quality conditions of corresponding channels; and next the source eNB 10 forwards the foregoing measurement information to the destination eNB 20, and optionally the information forwarded from the source eNB 10 to the destination eNB 20 further includes security keys related to the respective component carriers, and if a secondary component carrier has been determined by the source eNB 10, then the information forwarded from the source eNB 10 to the destination eNB 20 can further include indication information of the secondary component carrier, etc.

In correspondence with the step S11 performed by the source eNB 10, the destination eNB 20 determines a primary component carrier jointly with the source eNB 10 in the step S21 at the side of the destination eNB 20. In this embodiment, the step S21 comprises the following steps: firstly the destination eNB 20 receives measurement information reported by the user equipment 30 from the source eNB 10; and next the destination eNB 20 synthetically considers the foregoing measurement information of the component carriers and traffic loads of the component carriers CC1, CC2 and CC3 with which the destination eNB 20 itself is configured to determine a primary component carrier. For example, if the component carrier CC2 has a lower traffic load while the measurement information reflects that its channel quality is better, then the destination eNB 20 determines the component carrier CC2 as the primary component carrier.

With the foregoing steps, the component carrier CC2 is determined as the primary component carrier, and then in the step S22, the destination eNB 20 transmits a handover command to be transmitted to the user equipment 30 to the source eNB 10, and the handover command includes indication information that the component carrier CC2 is determined as the primary component carrier. Optionally the handover command further includes assignment information of a dedicated preamble over the respective component carriers CC1, CC2 and CC3. Then in the step S12, the source eNB 10 receives the foregoing handover command to be transmitted to the user equipment 30 from the destination eNB 20. Next in the step S13, the source eNB 10 forwards the handover command to the user equipment 30.

Correspondingly a flow chart of a method of handing over a service of the user equipment from the source eNB 10 to the destination eNB 20 at the side of the user equipment 30 includes the step S31 and the step S32.

In the step S31, the user equipment 30 receives a handover command forwarded from the source eNB 10, wherein the handover command includes indication information of a determined primary component carrier CC2. Optionally the handover command further includes assignment information of a dedicated preamble.

Next in the step S32, the user equipment 30 accesses the destination eNB 20. For example, the user equipment 30 accesses the destination eNB 20 according to the assignment information of the dedicated preamble included in the handover command. Alternatively the user equipment 30 can directly perform a contention-based access to the destination eNB 20 in the case that the handover command does not include any dedicated preamble assignment information. The handover command includes assignment information of a dedicated preamble over the respective component carriers CC1, CC2 and CC3. For example, the dedicated preamble is assigned over the determined primary component carrier CC2, and then the user equipment 30 performs a contention-free access over the primary component carrier CC2. If there is insufficient preamble resource over the primary component carrier CC2 so that the destination eNB 20 assigns a dedicated preamble over a secondary component carrier, e.g., over the CC3, then the user equipment 30 performs a contention-free access over the component carrier CC3. Optionally if the contention-free access performed over the secondary component carrier CC3 fails, then the user equipment 30 further performs a contention-based access over the primary component carrier CC2. Also optionally if the contention-free access performed by the user equipment 30 over the primary component carrier CC2 fails, then a contention-based access can be performed again over the primary component carrier CC2. Of course, the contention-free access performed over the primary component carrier CC2 may fail at this time due to a severe channel condition of the carrier, which can not be alleviated in a short period of time, so it is not necessary for the user equipment 30 to perform a contention-based access over the primary component carrier CC2 again. At this time the user equipment 30 can directly announce an access/handover failure after the contention-free access performed over the primary component carrier CC2 fails.

In another embodiment of the invention, the source eNB 10 can be a dominator device for determining a secondary component carrier of the destination eNB 20. In this embodiment, the following steps are performed at the side of the source eNB 10: the source eNB 10 determines a secondary component carrier for the user equipment 30; and transmits indication information of the secondary component carrier to the destination eNB 20. Then in the step S12, the handover command received by the source eNB 10 can further include the indication information of the determined secondary component carrier.

For example, the source eNB 10 determines one or more predetermined secondary component carriers, e.g., the CC3, for the user equipment 30 according to the measurement information obtained by the source eNB 10 from the user equipment 30, and notifies the destination eNB 20 of indication information that the CC3 is determined as a secondary component carrier. The destination eNB 20 can directly accept the predetermined secondary component carrier determined by the source eNB 10 as the secondary component carrier of the user equipment 30 or determines one or more of the plurality of predetermined secondary component carriers determined by the source eNB 10 as the secondary component carrier or carriers of the user equipment 30 according to a traffic load condition of the destination eNB 20 and optionally further according to the measurement information reported by the user equipment 30. Next the destination eNB 20 transmits a handover command including indication information of the secondary component carrier or carriers to the source eNB 10, and the source eNB 10 forwards the handover command to the user equipment 30. The user equipment 30 accesses the destination eNB 20 according to the indication information of the primary component carrier and the secondary component carrier or carriers included in the handover command and assignment information of a dedicated preamble over the component carriers.

In a further embodiment of the invention, the destination eNB 20 can be a dominator device for determining a secondary component carrier. In this embodiment, the step of determining one or more secondary component carriers for the user equipment 30 is performed at the side of the destination eNB 20. Then in the step S21, the handover command transmitted by the destination eNB 20 can further include indication information of the determined secondary component carrier or carriers.

For example, the source eNB 10 forwards all of measurement information from the user equipment 30 to the destination eNB 20, and the destination eNB 20 receives the measurement information from the user equipment 30 and then determines a secondary component carrier or carriers, e.g., the CC1 and the CC3, for the user equipment 30 according to the information and traffic load information of the destination eNB 20. And in the step S22, the destination eNB 20 notifies the user equipment 30 of indication information of the determined secondary component carrier or carriers in a handover command.

Those skilled in the art shall appreciate that after a reasonable variation, the method in the foregoing embodiments of the invention can also be applicable for a scenario where a secondary component carrier shall be determined during a handover of a service of a user equipment between two eNBs. By synthetically considering measurement information from the user equipment 30 and traffic load information of the destination eNB 20, the secondary component carrier or carriers are determined and forwarded to the user equipment for which a serving eNB is to be switched. The foregoing variation to the invention also falls into the scope of the invention. Different application objects are not limiting the scope of the invention.

Figure 5:
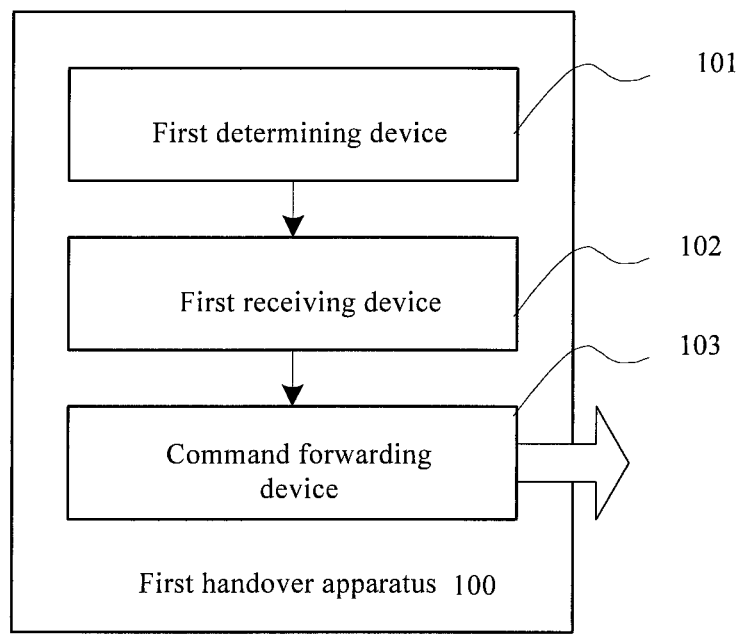
FIG. 5 illustrates a structural diagram of a first handover apparatus, in a source eNB, for handing over a service of a user equipment to a destination eNB according to an embodiment of the invention.

FIG. 5 illustrates a structural diagram of a first handover apparatus 100, in a source eNB, for handing over a service of a user equipment to a destination eNB according to an embodiment of the invention. As illustrated, the first handover apparatus 100 comprises a first determining device 101, a first receiving device 102 and a command forwarding device 103.

The first determining device 101 is configured to perform the step S11 in the foregoing method to determine a primary component carrier jointly with the destination eNB 20.

The first receiving device 102 is configured to perform the step S12 in the foregoing method to receive a handover command transmitted from the destination eNB 20 to the user equipment 30, the handover command including indication information of the primary component carrier. Optionally the handover command further includes dedicated preamble assignment information. Optionally the handover command further includes security key information corresponding to the primary component carrier and/or relevant information of a secondary component carrier.

The command forwarding device 103 is configured to perform the step S13 in the foregoing method to forward the handover command to the user equipment 30.

Figure 6:
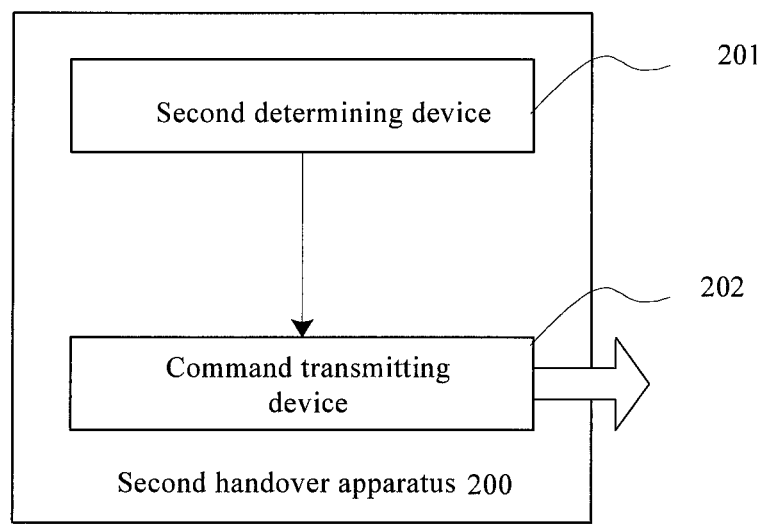
FIG. 6 illustrates a structural diagram of a second handover apparatus, in a destination eNB, for handing over a service of a user equipment from a source eNB to the destination eNB according to an embodiment of the invention.

FIG. 6 illustrates a structural diagram of a second handover apparatus 200, in a destination eNB, for handing over a service of a user equipment from a source eNB to the destination eNB 20 according to an embodiment of the invention. As illustrated, the second handover apparatus 200 comprises a second determining device 201 and a command transmitting device 202.

The second determining device 201 is configured to perform the step S21 in the foregoing method to determine a primary component carrier jointly with the source eNB 10.

The command transmitting device 202 is configured to perform the step S22 in the foregoing method to transmit a handover command to be transmitted to the user equipment 30 to the source eNB 10, the handover command including indication information of the primary component carrier. Optionally the handover command further includes dedicated preamble assignment information. Optionally the handover command further includes security key information corresponding to the primary component carrier and/or relevant information of a secondary component carrier.

Optionally the second determining device 201 comprises the following modules (not illustrated in the figure):

A receiving module configured to receive measurement information from the user equipment.

A first determining module configured to determine a predetermined primary component carrier according to the measurement information.

A notifying module configured to notify the destination eNB of indication information of the predetermined primary component carrier.

According to another embodiment of the invention, the second determining device 201 comprises the following modules (not illustrated in the figure):

A first receiving module configured to receive measurement information about a component carrier of the destination eNB 20 from the user equipment 30.

A forwarding module configured to forward the measurement information to the destination eNB 20.

Figure 7:
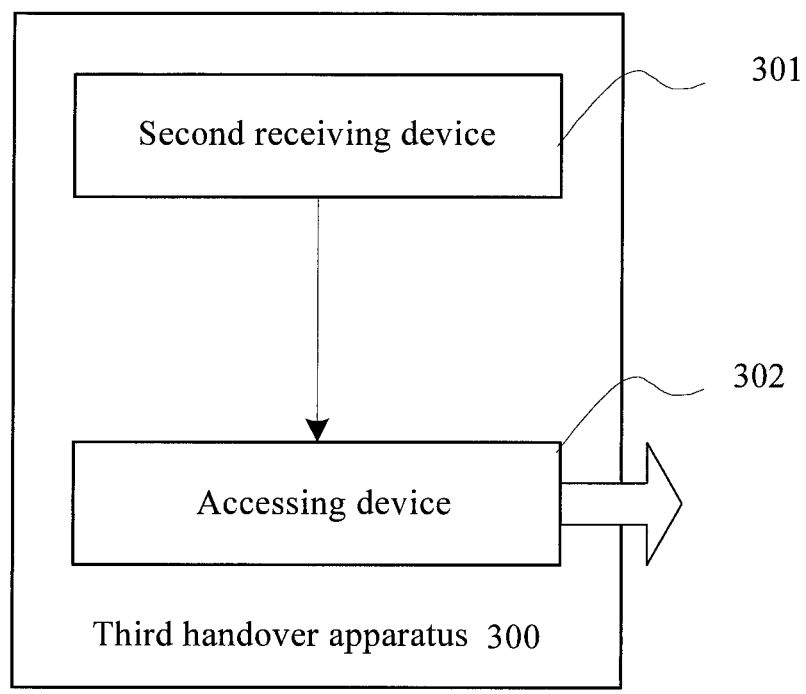
FIG. 7 illustrates a structural diagram of a third handover apparatus, in a user equipment in a wireless communication network with carrier aggregation, for handing over a service of the user equipment from a source eNB to a destination eNB according to an embodiment of the invention.

FIG. 7 illustrates a structural diagram of a third handover apparatus 300, in a user equipment in a wireless communication network with carrier aggregation, for handing over a service of the user equipment from a source eNB to a destination eNB according to an embodiment of the invention. As illustrated, the third handover apparatus 300 comprises a second receiving device 301 and an accessing device 302.

The second receiving device 301 is configured to perform the step S31 in the foregoing method to receive a handover command from the side of the source eNB, the handover command including indication information of a determined primary component carrier. Optionally the handover command further includes dedicated preamble assignment information.

The accessing device 302 is configured to perform the step S32 in the foregoing method to access the destination eNB 20.

Optionally the second receiving device 301 further includes the following modules (not illustrated in the figure):

A second receiving module configured to receive indication information of a predetermined primary component carrier from the source eNB.

A second determining module configured to determine whether to determine the predetermined primary component carrier as the primary component carrier according to a traffic load.

According to another embodiment of the invention, the second receiving device 301 further includes the following modules (not illustrated in the figure):

A third receiving module configured to receive measurement information of the user equipment from the source eNB.

A third determining module configured to determine the primary component carrier according to the measurement information and a traffic load of the destination eNB.

It shall be noted that the foregoing embodiments are merely illustrative but not to limit the invention. Any technical solutions without departing from the spirit of the invention shall fall into the scope of invention, including the use of different technical solutions appearing in different embodiments as arranged in any arrangement combination to advantage. Moreover any reference numerals in the claims shall not be construed as limiting the claims in question; the term "comprising" will not preclude another device(s) or step(s) which is (are) listed in the other claim(s) or the description; "a" or "an" preceding a device will not preclude the presence of a plurality of such a device; a function or functions of one or more of a plurality of devices included in an apparatus can be performed by the same device in hardware or software; and the terms "first", "second", "third", etc., are merely intended to designate a name but not to suggest any specific order.

The invention claimed is:

1. A method, in a source eNB in a wireless communication network with carrier aggregation, of handing over a service of a user equipment to a destination eNB, the method comprising the steps of:
   A. determining a primary component carrier jointly with the destination eNB, the determining comprising:
      receiving measurement information from the user equipment;
      receiving traffic load information fed back from the destination eNB; and
      determining the primary component carrier according to the traffic load information and the measurement information; and
      notifying the destination eNB of indication information of the predetermined primary component carrier;
   B. receiving a handover command transmitted from the destination eNB to the user equipment, the handover command including indication information of the primary component carrier; and C. forwarding the handover command to the user equipment.

2. The method according to claim 1, wherein the step A comprises the steps of:
receiving measurement information about a component carrier of the destination eNB from the user equipment; and
forwarding the measurement information to the destination eNB.

3. The method according to claim 2, wherein the step A further comprises the step of:
forwarding a security key related to the component carrier to the destination eNB.

4. The method according to claim 1, wherein the handover command further includes dedicated preamble assignment information.

5. The method according to claim 1, further comprising the steps of:
determining at least one secondary component carrier; and
transmitting indication information of the at least one secondary component carrier to the destination eNB; and
wherein the handover command received in the step B further includes the indication information of the at least one secondary component carrier.

6. A method, in a destination eNB in a wireless communication network with carrier aggregation, of handing over a service of a user equipment from a source eNB to the destination eNB, the method comprising the steps of:
a. determining a primary component carrier jointly with the source eNB by:
receiving indication information of a predetermined primary component carrier from the source eNB;
determining whether to determine the predetermined primary component carrier as the primary component carrier according to a traffic load;
receiving measurement information of the user equipment from the source eNB; and
determining the primary component carrier according to the measurement information and the traffic load of the destination eNB; and
b. transmitting a handover command to be transmitted to the user equipment to the source eNB, the handover command including indication information of the primary component carrier.

7. The method according to claim 6, wherein the step a further comprises:
notifying the source eNB of indication information of a component carrier with a lower traffic load than the predetermined primary component carrier if the predetermined primary component carrier is not determined as the primary component carrier; or
transmitting acknowledgement information about the primary component carrier to the source eNB if the predetermined primary component carrier is determined as the primary component carrier.

8. The method according to claim 6, wherein the handover command further includes dedicated preamble assignment information.

9. The method according to claim 6, further comprising the step of:
determining at least one secondary component carrier; and
wherein the handover command in the step b further includes indication information of the at least one secondary component carrier.

10. A method, in a user equipment in a wireless communication network with carrier aggregation, of handing over a service of the user equipment from a source eNB to a destination eNB, the method comprising the steps of:
I. receiving a handover command from the source eNB, the handover command including indication information of a determined primary component carrier; and
II. accessing the destination eNB;
wherein the determined primary component carrier is determined as a function of traffic load information fed back from the destination eNB and measurement information provided by the user equipment.

11. The method according to claim 10, wherein the handover command further includes dedicated preamble assignment information, and the step II further comprises:
accessing the destination eNB without contention according to the dedicated preamble assignment information; and
if the access without contention fails, the user equipment performing a contention-based access over the primary component carrier.

12. A handover apparatus, in a source eNB in a wireless communication network with carrier aggregation, for handing over a service of a user equipment to a destination eNB, the apparatus comprising:
a determining device configured to determine a primary component carrier jointly with the destination eNB by:
receiving measurement information from the user equipment;
receiving traffic load information fed back from the destination eNB; and
determining the primary component carrier according to the traffic load information and the measurement information; and
notifying the destination eNB of indication information of the predetermined primary component carrier;
a receiving device configured to receive a handover command transmitted from the destination eNB to the user equipment, the handover command including indication information of the primary component carrier; and
a command forwarding device configured to forward the handover command to the user equipment.

13. A handover apparatus, in a destination eNB in a wireless communication network with carrier aggregation, for handing over a service of a user equipment from a source eNB to the destination eNB, the apparatus comprising:
a determining device configured to determine a primary component carrier jointly with the source eNB by:
receiving indication information of a predetermined primary component carrier from the source eNB;
determining whether to determine the predetermined primary component carrier as the primary component carrier according to a traffic load;
receiving measurement information of the user equipment from the source eNB; and
determining the primary component carrier according to the measurement information and a traffic load of the destination eNB; and
a command transmitting device configured to transmit a handover command to be transmitted to the user equipment to the source eNB, the handover command including indication information of the primary component carrier.

14. A handover apparatus, in a user equipment in a wireless communication network with carrier aggregation, for handing over a service of the user equipment from a source eNB to a destination eNB, the apparatus comprising:

a receiving device configured to receive a handover command, the handover command including indication information of a determined primary component carrier; and an accessing device configured to access the destination eNB according to dedicated preamble assignment information;

wherein the determined primary component carrier is determined as a function of traffic load information fed back from the destination eNB and measurement information provided by the user equipment.

* * * * *